United States Patent
Chandra et al.

(10) Patent No.: US 9,772,856 B2
(45) Date of Patent: Sep. 26, 2017

(54) SYSTEM-LEVEL DUAL-BOOT CAPABILITY IN SYSTEMS HAVING ONE OR MORE DEVICES WITHOUT NATIVE DUAL-BOOT CAPABILITY

(71) Applicant: Lattice Semiconductor Corporation, Hillsboro, OR (US)

(72) Inventors: Srirama Chandra, Beaverton, OR (US); Cleo Mui, Portland, OR (US); Cheng Jen Gwo, Portland, OR (US); Saurabh Chheda, Fremont, CA (US)

(73) Assignee: Lattice Semiconductor Corporation, Hillsboro, OR (US)

( * ) Notice: Subject to any disclaimer, the term of this patent is extended or adjusted under 35 U.S.C. 154(b) by 359 days.

(21) Appl. No.: 14/327,811

(22) Filed: Jul. 10, 2014

(65) Prior Publication Data

US 2016/0011878 A1    Jan. 14, 2016

(51) Int. Cl.
*G06F 9/44* (2006.01)
*G06F 12/02* (2006.01)
*G06F 12/06* (2006.01)
*G06F 11/00* (2006.01)
*G06F 11/14* (2006.01)

(52) U.S. Cl.
CPC ............ *G06F 9/4401* (2013.01); *G06F 11/00* (2013.01); *G06F 11/1417* (2013.01); *G06F 12/0246* (2013.01); *G06F 12/0638* (2013.01); *G06F 2212/205* (2013.01); *G06F 2212/7208* (2013.01)

(58) Field of Classification Search
CPC ................................ G06F 9/4401; G06F 11/14
See application file for complete search history.

(56) References Cited

U.S. PATENT DOCUMENTS

| | | | | |
|---|---|---|---|---|
| 6,357,021 | B1* | 3/2002 | Kitagawa | G06F 8/65 714/38.1 |
| 6,421,792 | B1* | 7/2002 | Cromer | G06F 11/1417 713/2 |
| 6,442,067 | B1* | 8/2002 | Chawla | G06F 8/60 365/185.08 |
| 6,532,551 | B1* | 3/2003 | Kamei | G06F 11/073 714/13 |

(Continued)

*Primary Examiner* — Jaweed A Abbaszadeh
*Assistant Examiner* — Gary Collins
(74) *Attorney, Agent, or Firm* — Haynes and Boone, LLP

(57) ABSTRACT

In one embodiment, a system has a master programmable device (PD) with native dual-boot capability and one or more slave PDs with no native dual-boot capability. A master golden image includes an embedded dual-boot function. During power-up, each PD copies its primary image into its volatile configuration memory and determines whether the primary image is valid. When the master's configuration engine detects an invalid master primary image, then the master's native dual-boot capability enables the master to implement a system-reboot procedure, which includes copying the master golden image from an external memory device into the master's volatile configuration memory and launching the embedded dual-boot function, which in turn copies the slave golden images from the external memory device into the slaves' volatile configuration memories before enabling other master-golden-image functions. Significant system reliability and robustness are achieved without provisioning every PD with native dual-boot capability.

17 Claims, 2 Drawing Sheets

(56) References Cited

U.S. PATENT DOCUMENTS

| | | | |
|---|---|---|---|
| 7,043,664 B1* | 5/2006 | Chiloyan | G06F 11/1417 |
| | | | 714/5.11 |
| 7,301,822 B1 | 11/2007 | Walstrum, Jr. et al. | |
| 7,425,843 B1 | 9/2008 | Edwards et al. | |
| 7,576,561 B1 | 8/2009 | Huang | |
| 7,908,470 B1* | 3/2011 | Cavanna | G06F 9/4401 |
| | | | 711/1 |
| 7,962,777 B2* | 6/2011 | Gonzalez | G06F 11/1068 |
| | | | 714/5.1 |
| 8,060,784 B1 | 11/2011 | Spinti et al. | |
| 8,122,234 B1* | 2/2012 | Orr | G06F 11/1417 |
| | | | 713/1 |
| 9,230,112 B1* | 1/2016 | Peterson | G06F 21/575 |
| 2003/0005277 A1* | 1/2003 | Harding | G06F 11/1417 |
| | | | 713/2 |
| 2003/0084337 A1* | 5/2003 | Simionescu | G06F 9/4416 |
| | | | 713/190 |
| 2004/0030883 A1* | 2/2004 | Munguia | G06F 9/441 |
| | | | 713/100 |
| 2005/0132351 A1* | 6/2005 | Randall | G06F 11/1433 |
| | | | 717/168 |
| 2005/0251673 A1* | 11/2005 | Bosley | G06F 11/1433 |
| | | | 713/2 |
| 2006/0059327 A1* | 3/2006 | Brown | G06F 9/44505 |
| | | | 713/1 |
| 2013/0111457 A1* | 5/2013 | Culter | G06F 8/65 |
| | | | 717/171 |
| 2013/0232328 A1* | 9/2013 | Johnson | G06F 8/60 |
| | | | 713/2 |
| 2014/0173328 A1* | 6/2014 | Dasari | G06F 11/0793 |
| | | | 714/2 |

\* cited by examiner

SYSTEM-LEVEL DUAL-BOOT CAPABILITY IN SYSTEMS HAVING ONE OR MORE DEVICES WITHOUT NATIVE DUAL-BOOT CAPABILITY

BACKGROUND

Field of the Invention

The present invention relates to electronics and, more specifically but not exclusively, to dual-boot capability for systems having multiple programmable devices, such as programmable logic devices and/or programmable mixed-signal devices.

Description of the Related Art

This section introduces aspects that may help facilitate a better understanding of the disclosure. Accordingly, the statements of this section are to be read in this light and are not to be understood as admissions about what is prior art or what is not prior art.

Some programmable devices (PDs), such as programmable logic devices (PLDs) and programmable mixed-signal devices (PMDs) have both on-chip volatile configuration memory and on-chip non-volatile configuration memory, where a primary image is programmed into the non-volatile memory and then, upon device power-up, copied from the non-volatile memory into the volatile memory for use in operating the PD. As the terms are used here, a field-programmable gate array (FPGA) is assumed to be a type of PLD. While the devices operate using the image stored in the volatile configuration memory, it is possible to reprogram the on-chip non-volatile configuration memory through a process called background programming. If the background programming process is interrupted (e.g., power cycling the board), then the PD wakes up with a faulty primary image stored in the non-volatile memory. At that time, the PD might not be able to boot up properly, resulting in a system failure. As used in this specification, the term "programming" and its variants refer to the storage of images into non-volatile memory, while the term "configuration" and its variants refer to the copying of images from non-volatile memory into volatile memory, e.g., upon power-up.

Some PDs have native dual-boot capability that enables the PD to boot up even when the primary image is invalid. In particular, when the PD fails to boot up properly due to an invalid primary image, the PD copies a fail-safe ("golden") image, e.g., from an off-chip non-volatile memory device, into its volatile memory for use in booting up the PD. Depending on the particular implementation, the functionality of the golden image may be the same as or different from that of the primary image.

In the absence of dual-boot capability, a PD having an invalid primary image cannot recover from a boot-up failure, and external intervention is required to detect and correct the situation.

BRIEF DESCRIPTION OF THE DRAWINGS

Other embodiments of the disclosure will become more fully apparent from the following detailed description, the appended claims, and the accompanying drawings in which like reference numerals identify similar or identical elements.

DETAILED DESCRIPTION

Certain embodiments of the disclosure enable multi-PD systems to be implemented with as few as a single PD having native dual-boot capability and the rest of the PDs having no native dual-boot capability and still extend the dual-boot capability to the entire system. In this way, the disclosure can extend some of the advantages of system-level dual-boot capability (e.g., system reliability, robustness) without having to provide each PD in the system with native dual-boot capability.

Figure 1:
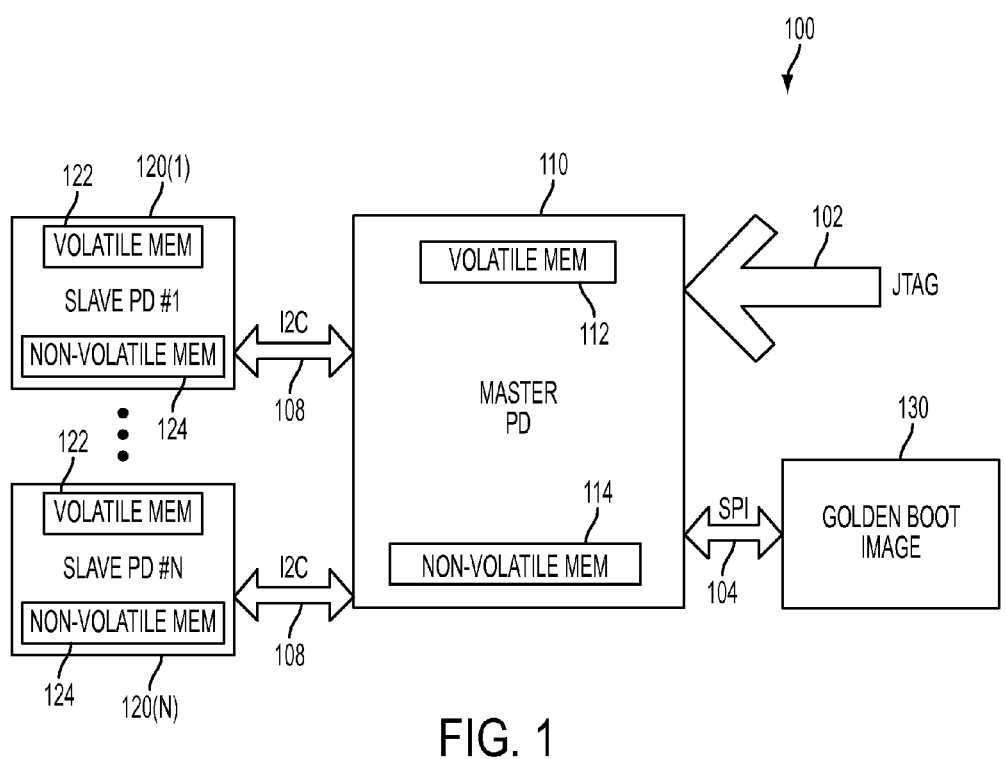
FIG. 1 shows a block diagram of a multi-device system according to one embodiment of the disclosure.

FIG. 1 shows a block diagram of a multi-device system 100 according to one embodiment of the disclosure. System 100 comprises a master programmable device (PD) 110, N slave PDs 120, and an external non-volatile memory device 130, where N is a positive integer. Master PD 110 has both master volatile configuration memory 112 (e.g., SRAM) and master non-volatile configuration memory 114 (e.g., flash, EEPROM). In addition, each slave PD 120 has slave volatile configuration memory 122 and slave non-volatile configuration memory 124. In each PD, the non-volatile memory can be programmed with a primary image, such that, upon power-up, the PD copies the primary image from its non-volatile memory into its volatile memory for use in operating the PD. Each programming and configuration interface 108 (e.g., I2C bus) enables master PD 110 to program and configure the corresponding slave PD 120.

External non-volatile memory device 130 stores a combined golden image that includes a master golden image for master PD 110 as well as N slave golden images, one for each different slave PD 120. The master golden image (e.g., 202(0) of FIG. 2) includes a special dual-boot function in addition to one or more other functions designed for maintaining the system functionality.

Master PD 110 has conventional, native dual-boot capability that enables the master PD to detect invalidity of the master primary image before the master primary image is copied from master non-volatile memory 114 into master volatile memory 112 upon power-up of the master PD. Each slave PD 120 in system 100 has no native dual-boot capability. As such, each slave PD 120 has no way of to recover when its non-volatile image (124) is invalid.

System 100 is programmed using the following three-step system-programming procedure to ensure that slave PDs are programmed with valid images before programming the master PD, since only the master PD has the native dual-boot capability.

1) Master PD 110 is erased, where the master volatile memory 112 is erased first;
2) After step (1) is successfully completed, the slave non-volatile memory 124 of each slave PD 120 is erased and then programmed with its respective slave primary image, e.g., via interface 108. The slave primary image may be provided by an external device such as device 130 via interface 104 or a microprocessor via JTAG interface 108. The programming of the slave non-volatile memory is then verified (e.g., by performing an appropriate checksum analysis); and
3) After step (2) is successfully completed, master non-volatile memory 114 of master PD 110 is programmed with its master primary image via interface 102, and the programming of the master non-volatile memory is then verified.

When, upon system power-up or even just device power-up, the configuration engine (not shown) of master PD 110 determines that the master primary image is corrupted or otherwise invalid, the following five-step system-reboot procedure is implemented:

1) The native dual-boot capability of master PD 110 causes the master PD to configure the master volatile memory 114 with the master golden image 202(0) from external non-volatile memory device 130 via interface 104;
2) Master PD 110 then executes (i.e., initiates) the dual-boot function loaded from the master golden image 202(0);
3) The dual-boot function is executed first. When the dual-boot function is in operation, all other functionalities in master PD 110 are in an idle state;
4) The dual-boot function then configures the slave volatile memory 124 of the each slave PD 120 using the corresponding slave golden image (e.g., 202(1) to 202(N) of FIG. 2) from memory device 130.
5) After all the slave devices are configured, the dual-boot function flags completion to the rest of functions in master PD 110. After that, the rest of the functions in the master PLD/PMD can start to operate.

After this system-reboot procedure is successfully completed, master PD 110 and all N slave PDs 120 in system 100 will be configured to operate under the control of their respective golden images.

During the system-programming or background-programming procedure, any occurrence of system-level power cycling or even power cycling of just master PD 110 could result in storing incomplete images in master non-volatile memory 114 and/or one or more slave non-volatile memories 124. Under this condition, upon power up, the master PD will boot using the golden image stored in external non-volatile memory device 130 instead of primary non-volatile image 114. This triggering of the booting from external memory 130 is just a manifestation of the native dual-boot capability of master PD 110.

With respect to the three different steps of the system-programming procedure, if power cycling occurs during the first step of erasing the master non-volatile memory, then, upon the power-up phase of the power cycling, the master device 110 will load its volatile memory 112 from golden image 202(0) stored in the external non-volatile memory device 130. After the master PD's volatile memory 112 is configured, the dual-boot program begins to execute and loads the slave golden images 202(1) to 202(N) stored in memory device 130 into the slave PDs' volatile memories 122(1) to 122(N). The slave PD-specific image downloaded from the golden boot memory 130 will overwrite the contents stored in the corresponding PD 120(1) to 120(N) volatile memory 122.

If power cycling occurs during the second step of erasing, programming, and verifying the slave non-volatile memories of the N different slave PDs, then, upon the power-up phase of the power cycling, the master device 110 will load its volatile memory 112 from golden image 202(0) stored in the external non-volatile memory device 130. After the master PD's volatile memory 112 is configured, the dual-boot program begins to execute and loads the image stored in golden images 202(1) to 202(N) into the slave PDs' volatile memories 122(1) to 122(N).

If power cycling occurs during the third step of programming and verifying the master non-volatile memory of the master PD, then the power-up phase of the power cycling might occur during the programming portion of the third step or during the verifying portion of the third step. If the power-up phase occurs during the programming portion, then the master device 110 will load its volatile memory 112 from golden image 202(0) stored in the external non-volatile memory device 130. After the master PD's volatile memory 112 is configured, the dual-boot program begins to execute and loads the images stored in golden images 202(1) to 202(N) into slave PDs' volatile memory 122(1) to 122(N).

Certain embodiments of the disclosure might not be able to recover from every instance of corruption of a master or slave primary image, but these embodiments can still provide significant system-level reliability and robustness without having to provision every PD in the system with native dual-boot capability.

In addition to multi-PD systems, such as system 100 of FIG. 1, the present disclosure also includes computer-implemented software-development tools that can be used to generate the master and slave golden images for those multi-PD systems. In one embodiment, a software designer can use such a software-development tool to generate a new master golden image and/or one or more new slave golden images for system 100 of FIG. 1.

This embodiment of the software-development tool has (at least) two features, the details of which the design engineer may be unaware. First of all, when a software designer is generating a new master golden image for system 100, the software-development tool can be configured to embed the new master golden image with the dual-boot function along with the one or more master-PD functions that the software designer is actively designing. As such, the software designer does not need to know any details about the dual-boot function, yet is able to use the software-development tool to generate master golden images with appropriate, embedded dual-boot functions.

Second, when a software designer is generating a new master golden image and/or one or more new slave golden images for system 100, the software-development tool can be configured to combine the resulting golden images into a single, combined golden image for storage in a single external non-volatile memory device, such as device 130 of FIG. 1, such that the dual-boot function of the master golden image is enabled to extract and separately copy the master golden image and each slave golden image from the external non-volatile memory device into the appropriate PD volatile memory. This involves the software-development tool and the dual-boot function having a priori knowledge of the formatting of the various golden images into the combined golden image that a programming tool can understand.

Figure 2:
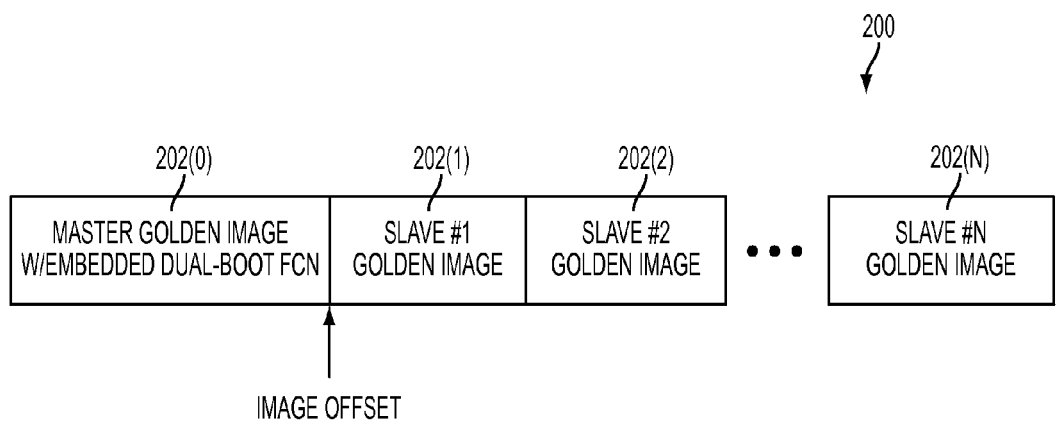
FIG. 2 shows the formatting of an example combined golden image for storage in the external non-volatile memory device of FIG. 1.

FIG. 2 shows the formatting of an exemplary combined golden image 200 for storage in external non-volatile memory device 130 of FIG. 1. According to this particular implementation, the master golden image for master PD 110 (with an embedded dual-boot function) is stored in a zeroth field 202(0) of memory device 130, the slave golden image for a first slave PD 120(1) is stored in a first field 202(1), the slave golden image for a second slave PD 120(2) is stored in a second field 202(2), and so on until the slave golden image for the Nth slave PD 120(N) is stored in an Nth field 202(N). The (possibly different) lengths of the (N+1) different fields 202 are known to both the software-development tool and the dual-boot function that gets embedded into the master golden image by the software-development tool.

Although FIG. 1 shows an embodiment in which (i) each primary image is stored on its corresponding PD and (ii) all of the golden images are stored on an external memory device as a single, combined golden image, the disclosure is not so limited. In general, one or more or even all of the golden images may be stored separately rather than combined, and individual primary images may be stored on-chip or off-chip.

Depending on the particular implementation, each PD in system 100 can be any suitable programmable device, such as, without limitation, a field-programmable gate array (FPGA), a programmable logic device, or a programmable mixed-signal device. Moreover, each PD may be a single, integrated device or a multi-component subsystem.

External non-volatile memory device 130 of FIG. 1 can be any suitable memory device, such as, without limitation, a (SPI) flash drive, or an EEPROM (electronically erasable programmable read-only memory).

Each different interface in system 100 can be any suitable interface, such as, without limitation, a serial peripheral interface (SPI), a joint test action group (JTAG) interface, or an inter-integrated circuit (I2C) interface.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

Signals and corresponding nodes, ports, or paths may be referred to by the same name and are interchangeable for purposes here.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

It will be further understood that various changes in the details, materials, and arrangements of the parts which have been described and illustrated in order to explain embodiments of this disclosure may be made by those skilled in the art without departing from embodiments of the disclosure encompassed by the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

What is claimed is:

1. A system comprising:
   a master programmable device (PD) having native dual-boot capability; and
   a slave PD without native dual-boot capability and connected to the master PD, wherein:
   the master PD has master volatile configuration memory;
   the slave PD has slave volatile configuration memory;
   a first non-volatile configuration memory in the system stores a master primary image for the master PD;
   a second non-volatile configuration memory in the system stores a slave primary image for the slave PD; and
   a third non-volatile memory in the system stores a master golden image for the master PD and a slave golden image for the slave PD, wherein the master golden image comprises a dual-boot function and one or more other master-PD functions and the system is designed such that:
   during system power-up, (i) the master PD copies the master primary image from the first non-volatile memory into the master volatile memory and (ii) the slave PD copies the slave primary image from the second non-volatile memory into the slave volatile memory; and
   in response to the master PD detecting that the master primary non-volatile image is invalid:
   (1) the master PD copies the master golden image from the third non-volatile memory, instead of the master primary image from the first non-volatile configuration memory, into the master volatile memory of the master PD;
   (2) then the master PD launches the dual-boot function of the master golden image;
   (3) then the dual-boot function inhibits the one or more other master-PD functions of the master golden image;
   (4) then the dual-boot function copies the slave golden image from the third non-volatile memory into the slave volatile memory of the slave PD; and
   (5) then the dual-boot function enables the one or more other master-PD functions of the master golden image.

2. The system of claim 1, wherein:
   the master primary image is stored in master non-volatile memory within the master PD such that the first non-volatile memory is part of the master non-volatile memory within the master PD; and
   the slave primary image is stored in slave non-volatile memory within the slave PD such that the second non-volatile memory is part of the slave non-volatile memory within the slave PD.

3. The system of claim 1, wherein the first non-volatile memory is external to the master PD.

4. The system of claim 1, wherein the second non-volatile memory is external to the slave PD.

5. The system of claim 1, further comprising an external memory device, wherein the master golden image and the slave golden image are stored in the external memory device such that the third non-volatile memory is part of the external memory device.

6. The system of claim 5, wherein the external memory device is directly connected to the master PD, but not directly connected to the slave PD.

7. The system of claim 5, wherein:
the master and slave golden images are stored as a single, combined golden image in the external memory device; and
the dual-boot function of the master golden image is configured to extract and separately copy the master golden image and the slave golden image from the external memory device into the corresponding volatile memories of the master and slave PDs.

8. The system of claim 1, wherein the system is programmed by:
(a) erasing memory for the master PD;
(b) then erasing, programming, and verifying memory for the slave PD; and
(c) then programming and verifying the memory for the master PD.

9. The system of claim 8, wherein the system is designed such that, when power cycling occurs during any of steps (a), (b), and (c) of claim 8, then steps (1)-(5) of claim 1 are implemented.

10. The system of claim 8, further comprising one or more other slave PDs, wherein:
step (4) of claim 1 further comprises, for each other slave PD, the dual-boot function copying a corresponding slave golden image from the third non-volatile memory into corresponding slave volatile memory within the other slave PD; and
step (b) of claim 8 further comprises, for each other slave PD, erasing, programming, and verifying corresponding slave primary memory within the other slave PD.

11. A method comprising:
providing a master programmable device (PD) having volatile configuration memory and non-volatile configuration memory for storing a master primary image for the master PD, at least one slave PD without native dual-boot capability having volatile configuration memory and non-volatile configuration memory for storing a slave primary image for the slave PD, and a non-volatile memory device storing a master golden image for the master PD and a slave golden image for the slave PD; and
upon detecting that the master primary image for the master PD is invalid:
causing the master PD to copy the master golden image from the non-volatile memory device, instead of the master primary image from the non-volatile configuration memory, into the volatile configuration memory of the master PD; and
causing the master PD to copy the slave golden image from the non-volatile memory device into the volatile configuration memory of the slave PD.

12. The method of claim 11, wherein the method further includes:
providing at least a second slave PD having volatile configuration memory and non-volatile configuration memory for storing a slave primary image for the second slave PD, and the memory device for storing a slave golden image for the second slave PD; and
upon detecting that the master primary image for the master PD is invalid:
causing the master PD to copy the slave golden image for the second slave PD from the memory device into the volatile configuration memory of the second slave PD.

13. A system comprising:
a master programmable device (PD) having volatile configuration memory and non-volatile configuration memory for storing a master primary image for the master PD,
at least one slave PD without native dual-boot capability having volatile configuration memory and non-volatile configuration memory for storing a slave primary image for the slave PD; and
a non-volatile memory device storing a master golden image for the master PD and a slave golden image for the slave PD;
wherein the master PD is configured, upon detecting that the master primary image for the master PD is invalid, to copy the master golden image from the non-volatile memory device, instead of the master primary image from the non-volatile configuration memory, into the volatile configuration memory of the master PD and to copy the slave golden image from the non-volatile memory device into the volatile configuration memory of the slave PD.

14. The system of claim 13, wherein the memory device is external to the master PD and the slave PD.

15. The system of claim 14, wherein the memory device is directly connected to the master PD, but not directly connected to the slave PD.

16. The system of claim 13, wherein the master and slave golden images are stored as a combined golden image in the memory device.

17. The system of claim 13 including:
at least a second slave PD having volatile configuration memory and non-volatile configuration memory for storing a slave primary image for the second slave PD; and
the memory device storing a slave golden image for the second slave PD;
wherein the master PD is configured, upon detecting that the master primary image for the master PD is invalid to copy the slave golden image for the second slave PD from the memory device into the volatile configuration memory of the second slave PD.

* * * * *